United States Patent
Lee et al.

(10) Patent No.: US 8,712,226 B2
(45) Date of Patent: Apr. 29, 2014

(54) PLASTIC FLOOR-WALL TRANSITION METHODS, MATERIALS, AND APPARATUS

(75) Inventors: Jeremy R. Lee, Oscada, MI (US); Darren Taylor, Oscada, MI (US)

(73) Assignee: Oscoda Plastics, Inc., Oscoda, MI (US)

( * ) Notice: Subject to any disclaimer, the term of this patent is extended or adjusted under 35 U.S.C. 154(b) by 0 days.

(21) Appl. No.: 12/965,772

(22) Filed: Dec. 10, 2010

(65) Prior Publication Data

US 2011/0139339 A1    Jun. 16, 2011

Related U.S. Application Data

(60) Provisional application No. 61/285,804, filed on Dec. 11, 2009.

(51) Int. Cl.
*B29C 65/00* (2006.01)
*B32B 37/00* (2006.01)

(52) U.S. Cl.
USPC ........... 392/379; 156/497; 156/499; 392/382; 392/383; 392/384; 392/385

(58) Field of Classification Search
USPC .................. 156/73.5, 575; 392/379, 382–385
See application file for complete search history.

(56) References Cited

U.S. PATENT DOCUMENTS

| | | | |
|---|---|---|---|
| 3,658,627 A * | 4/1972 | Kaminsky | 156/497 |
| 5,656,126 A * | 8/1997 | Martinez | 156/574 |
| 6,871,013 B2 * | 3/2005 | Martinez | 392/379 |
| 2008/0142164 A1 | 6/2008 | Martinez | |
| 2010/0193118 A1 * | 8/2010 | Rouse et al. | 156/258 |

FOREIGN PATENT DOCUMENTS

| | | | | |
|---|---|---|---|---|
| DE | 19716192 | * | 10/1998 | B29C 65/10 |
| EP | 0007321 A1 | * | 2/1980 | B29C 3/00 |
| JP | 9300470 A | | 11/1997 | |
| JP | 2000/280349 A | | 10/2000 | |

OTHER PUBLICATIONS

PCT/US2010/059965 Feb. 10, 2011—International Search Report.
PCT/US2010/059965 Feb. 10, 2011—Written Opinion of the International Searching Authority.

* cited by examiner

*Primary Examiner* — Katarzyna Wyrozebski Lee
*Assistant Examiner* — Carson Gross
(74) *Attorney, Agent, or Firm* — Reising Ethington PC

(57) ABSTRACT

A method of flooring installation includes positioning a welding tip having a v-shaped plastic welding rod therein adjacent to a v-shaped joint formed between plastic flooring and plastic trim and heating the flooring, trim, and welding rod to flow the welding rod into the v-shaped joint to form a plastic weld bead and seal the joint. A welding tip and a welding rod are also disclosed.

6 Claims, 3 Drawing Sheets

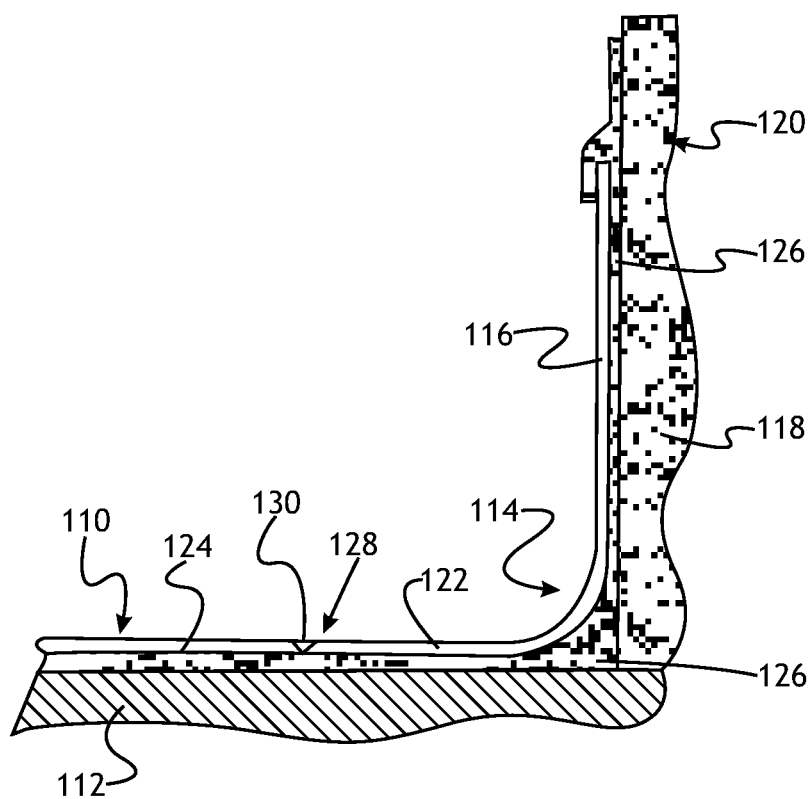
Fig. 5 - Prior Art

PLASTIC FLOOR-WALL TRANSITION METHODS, MATERIALS, AND APPARATUS

CROSS REFERENCE TO RELATED APPLICATION

This application claims the benefit of U.S. Provisional Application No. 61/285,804 filed Dec. 11, 2009. The disclosure of the above application is incorporated herein by reference.

TECHNICAL FIELD

The present invention generally relates to flooring and, more particularly, to methods of covering floors and floor-wall transitions with plastic material, and to related materials and apparatus.

BACKGROUND

Plastic flooring is generally known in the art, and may be installed according to the following steps for a basic floor. First, referring generally to prior art FIG. 5, flat sheets 110 of plastic floor are laid out over the entirety of a sub-floor 112 to be covered, and must be tightly dry fit to one another to ensure tight seams between adjacent sheets 110. Second, floor-wall moldings 114 composed of the flooring material are dry fit at all floor-wall transitions. More specifically, wall portions 116 of the moldings 114 are held against corresponding bases 118 of walls 120, and floor portions 122 of the moldings 114 are overlapped against corresponding margins (not shown) of the floor sheets 110. Third, the floor sheets 110 are scribed along edges of the floor portions 122 of the moldings 114 to define cut lines on the floor sheets 110. Fourth, the moldings 114 are removed and the floor sheets 110 are cut along the scribed cut lines and the excess floor margins are removed and discarded. Fifth, the moldings 114 are dry fit to the freshly cut floor sheets 110 to ensure tight seams between adjacent moldings 114 and the floor sheets 110. Sixth, the floor sheets 110 are removed. Seventh, an adhesive 124 is applied to the sub-floor 112. Eighth, all floor sheets 110 are wet fit and rolled in place over the adhesive 124. Ninth, an additional adhesive 126 is applied to the subfloor 112 and wall bases 118. Tenth, the moldings 114 are wet fit over the adhesive 126. Eleventh, the seams 128 between the floor sheets 110 and the moldings 114 are filled with welding beads 130 by heat welding of rods of the floor material to the sheets 110 and moldings 114.

Currently, high speed welding tips can be used on heat guns for the purpose of accomplishing relatively high speed welding between plastic materials. Typically, such high speed plastic welding tips incorporate an attachment portion that is generally cylindrical for attachment to a heat gun. The attachment portion tapers from its generally cylindrical area to a generally oval output at the opposite end. The output end is used to direct the flow of hot air used in the welding process. A welding rod feed section is secured to the output end. Typically, the welding rod feed section is cylindrical having a generally circular cross-section for receiving a plastic welding rod.

While the aforementioned floor covering method and apparatus are generally effective, certain limitations are inherent. For example, the floor-transition moldings can be somewhat costly and the molding techniques are particularly time-consuming. Also, current welding tips and rod shapes may limit the strength of welds between flooring sheets and moldings.

SUMMARY

A method of flooring installation includes applying plastic flooring to a sub-floor, applying plastic trim to a base portion of a wall to form a v-shaped joint between the flooring and the trim, positioning a welding tip having a v-shaped plastic welding rod therein adjacent to the joint, and heating the flooring, trim, and welding rod to flow the welding rod into the v-shaped joint to form a plastic weld bead and seal the joint. This method may reduce plastic flooring installation time as well as material and labor costs when compared to conventional plastic flooring installation techniques.

BRIEF DESCRIPTION OF THE DRAWINGS

The present invention will become more fully understood from the detailed description and the accompanying drawings, wherein:

FIG. 5 is a fragmentary cross-sectional view of a prior art floor-wall transition produced in accordance with a flooring method of the prior art.

DETAILED DESCRIPTION OF THE PREFERRED EMBODIMENTS

Figure 1:
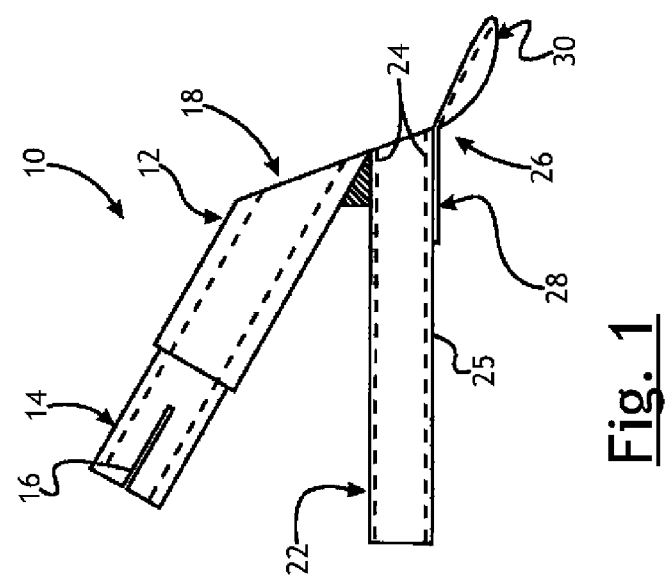
FIG. 1 is a plan view of an exemplary embodiment of a welding tip.

FIG. 1 shows a plan view of a welding tip 10 adapted to be received on a heat gun (not shown). Heat guns are well-known. Suitable heat guns for use in connection with the welding tip 10 include, but are not limited to, heat guns made by LEISTER®, FORSTHOFF®, and SINCLAIR®. It will be appreciated that any suitable heat gun may be used in accordance with the present invention.

The welding tip 10 has a base generally indicated at 12. The base 12 includes a generally cylindrical attachment portion 14 that is adapted to engage the heat gun (not shown). The attachment portion 14 may include one or more longitudinal slots 16. The longitudinal slots 16 give the attachment portion 14 some flexibility in order to firmly engage the heat gun. The base 12 extends from the attachment portion 14 to an output end 18. The output end 18 directs the flow of hot air, as will be described more fully below. The output end 18 may have an opening 20, which may be partially oval-shaped and partially straight as shown.

The welding tip 10 further includes a welding rod feed section 22. The welding rod feed section 22 is generally tubular and is secured to the output end 18 of the base 12. In one embodiment, the welding rod feed section 22 may have a flattened half-oval shaped cross-section with a corresponding opening 24, as best seen in FIG. 2. It will be appreciated that the rod feed section 22 may have any suitable cross-sectional shape.

The welding tip 10 further includes a lip generally indicated at 26. The lip 26 includes a securing portion 28 for securing the lip 26 with one wall 25 of the welding rod feed section 22. The securing portion 28 may extend beyond the edge of the welding rod feed section 22, as best seen in FIG.

1. The lip 26 further includes a flange 30 extending from the securing portion 28 at an angle relative to one wall 25 of welding rod feed section 22. In one preferred embodiment, the flange 30 extends at an angle of about 20-30°, for instance 25°, relative to the plane of the wall 25. The flange 30, as best shown in FIG. 1, may be spoon-shaped or dish-shaped and have a convex surface facing the opening 24 in the welding rod feed section 22. The convex surface may comprise metal that may be highly polished. Also, as best shown in FIG. 2, the flange 30 may have radiused lower corners.

The welding tip 10 may be composed of metal, for example, 304 stainless steel tubing, or any other suitable material. The base 12, feed section 22, and lip 26 may be secured to one another by welding, fastening, or any other suitable connection.

Figure 2A:
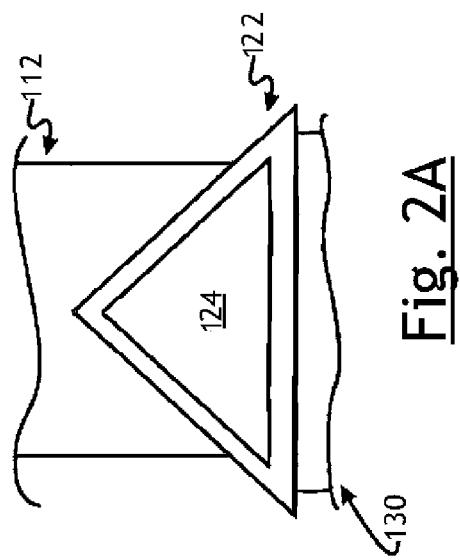
FIG. 2A is a fragmentary end view of a welding tip according to another embodiment.
Figure 2:
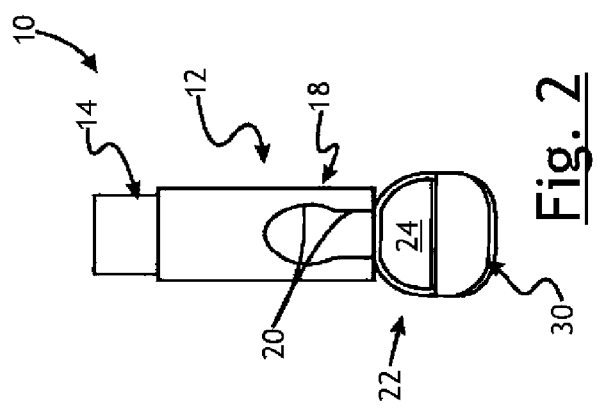
FIG. 2 is an end view of the welding tip of FIG. 1.

FIG. 2A illustrates another embodiment of a welding tip 10 including a base 112, a weld rod feed section 122 and corresponding opening 124, and a flange 130. In this embodiment, the feed section 122 and/or opening 124 has a v-shaped cross-section corresponding to the cross-section shown in FIG. 4. The v-shaped cross section need not be identical to the cross-section shown in FIG. 4 and, for example, may be larger to accommodate a slip fit of material therethough.

Figure 3:
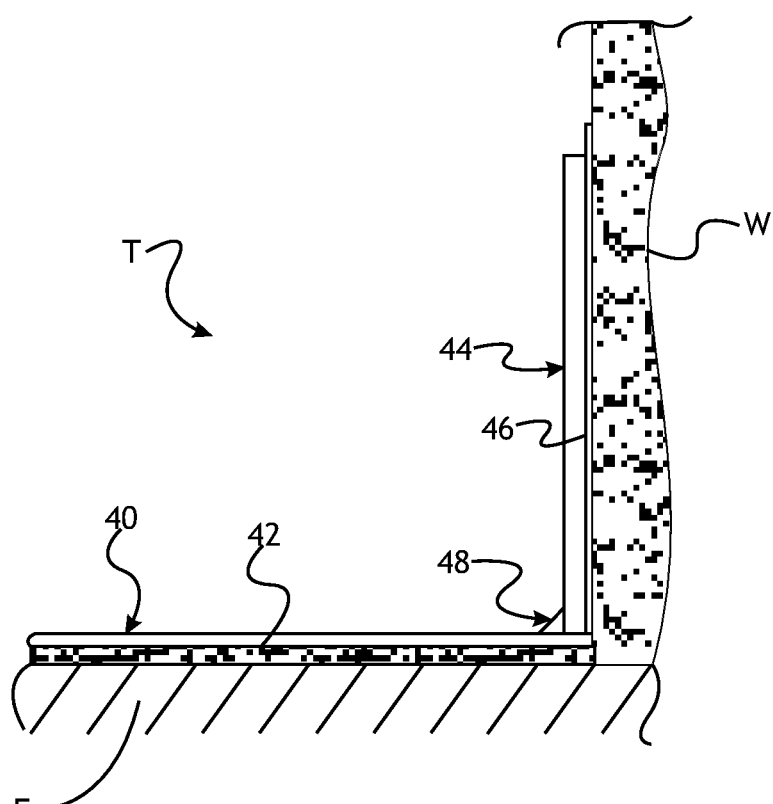
FIG. 3 is a fragmentary cross-sectional view of an exemplary embodiment of a floor-wall transition produced in accordance with an exemplary embodiment of a flooring method.

FIG. 3 is a fragmentary cross-sectional view of an exemplary embodiment of a floor-wall transition T produced in accordance with one embodiment of a method of floor covering disclosed herein below. As shown in FIG. 3, plastic flooring 40 is positioned against and adhered to a sub-floor F with an adhesive 42, and plastic trim 44 is positioned against and adhered to a wall W with an adhesive 46. A v-shaped joint is established between the flooring 40 and the trim 44. Also, a plastic weld bead 48 is heat welded in the v-shaped joint to corresponding portions of the flooring 40 and trim 44. The flooring 40 may include one or more individual sheets, rolled sheets, tiles, interlocking tiles, or any other suitable flooring product. The trim 40 may include one or more base moldings, cove bases, or the like, and may be in the form of strips, segments, inside corner pieces, outside corner pieces, or the like. The flooring 40 and the trim 44 may have the same thickness, although this is not required. The adhesives 42 and/or 46 may include PA 127, PA 139, and/or Eclectic 6100, all of which are available from Oscoda Plastics, the Assignee of the present invention, of Oscoda, Mich.

The flooring 40 and trim 44 and the weld bead 48 are preferably made from the same plastic material, for example, a thermoplastic material. The plastic material may comprise a vinyl material, and preferably may comprise polyvinylchloride. The plastic material may further include a suitable fiber reinforcement. One suitable plastic material is sold under the name PROTECT-ALL® by Oscoda Plastics, the Assignee of the present invention. It will be appreciated that while the preferred material is polyvinylchloride, any suitable plastic material may be used within the context of the present invention.

The subfloor F may comprise any material. By way of non-limiting example, the subfloor F may comprise wood, such as plywood or oriented strand board. Similarly, the sub-floor F may comprise concrete. While wood and concrete are specifically discussed as being suitable subfloor F, it will be appreciated that any suitable subfloor F may be used within the context of the present invention.

Figure 4:
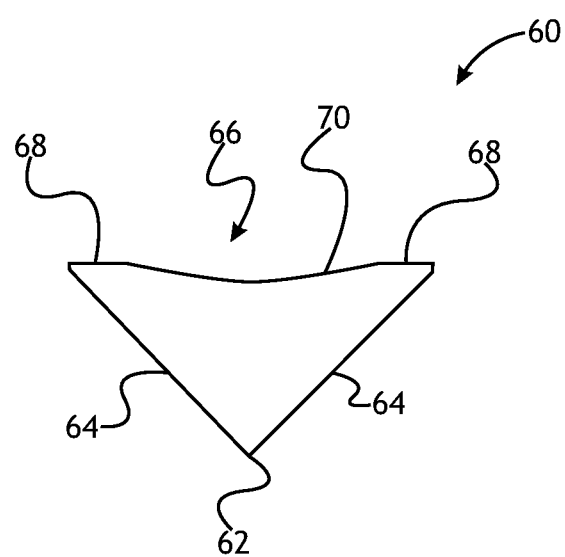
FIG. 4 is a cross-sectional view of an exemplary embodiment of a welding rod.

FIG. 4 is a cross-sectional view of one embodiment of a welding rod generally indicated at 60 that may be used to produce the weld bead 48 of FIG. 3. As shown in FIG. 4, the welding rod 60 has a generally triangular profile. The welding rod 60 can be of any desired length. In one embodiment, the cross-sectional shape of the welding rod 60 is constant along the entire length. In one embodiment, the triangular profile may comprise a substantially right triangle with the opposite angles each being about 43-45°. The welding rod 60 may include an intersection 62 defined by the right angle. The welding rod 60 may further include side walls 64 extending from the intersection 62. By using a welding rod 60 having the side walls 64 extending at substantially 86-90° from one another, a more uniform weld may be achieved. This is because the floor-wall transition T of FIG. 3 is similarly configured. The side walls 64 may be generally planar. The welding rod 60 further includes a long wall or hypotenuse generally indicated at 66. The hypotenuse 66 has generally planar and opposed end portions 68 at the outer edges adjacent the side walls 64 thereof. In one embodiment, the hypotenuse 66 may further include an incurvate portion 70 intermediate the generally planar end portions 68. The incurvate portion 70 provides a generally concave surface recessed in and along the welding rod 60. The incurvate portion 70 may be radiused, faceted, or the like.

It is preferred that the welding rod 60 be made from a similar material to that of the flooring 40 and trim 44. In one embodiment, the welding rod 60 may comprise polyvinylchloride. Further, by utilizing a welding rod 60 having a generally triangular configuration as described, a harder welding rod may be available than ones able to be used in prior applications. By way of non-limiting example, the welding rod may comprise PVC (polyvinylchloride) having a durometer hardness of 90 Shore A.

In accordance with the various embodiments, an exemplary method generally involves applying plastic flooring on a sub-floor, applying plastic trim to a base portion of a wall to form a v-shaped joint between the flooring and the trim, and welding the joint by positioning a welding tip having a v-shaped welding rod therein adjacent the joint and heating the flooring, trim, and welding rod to allow the welding rod to flow into the v-shaped joint. Portions of the method may be described in reference to FIGS. 1-4. The method steps may or may not be sequentially processed, and the invention encompasses any sequencing, overlap, or parallel processing of such steps.

First, an adhesive may be applied to a sub-floor. For example, the adhesive may be troweled on, or applied in any other suitable manner. Of course, suitable sub-floor preparation may be carried out before the adhesive is applied. For example, a sub-floor may be leveled, sanded, cleaned, or prepared in any other suitable manner to receive a floor covering according to the manufacturer's guidelines.

Second, plastic flooring may be applied to a sub-floor. For example, the flooring may include individual sheets, rolled sheet, tiles, interlocking tiles, or the like. The flooring may be arranged on the adhesive so that outer edges of the flooring are tight to the walls and fixed objects. The flooring may be applied so that adjacent edges form seams suitable for heat welding with a heat gun, tip, and welding rod.

Third, an adhesive may be applied to a wall. For example, the adhesive may be troweled on, caulked on, applied in any other suitable manner to base portions of walls. For example, base portions of walls may be from 0" to 9" from an adjacent floor, but any suitable size and scope of wall base portions may be applied with adhesive.

Fourth, plastic trim may be applied to a wall. For example, the trim may be applied to a base portion of the wall and may include strips, segments, inside corner pieces, outside corner pieces, or the like. The trim may be arranged on the adhesive so that lower edges of the trim are tight to the flooring. The trim may be applied so that its lower edges and the flooring form seams suitable for heat welding with a heat gun, tip, and welding rod.

Fifth, a plastic weld bead may be formed at a joint between plastic trim on a wall and flooring on a subfloor. For example, a heat gun and a welding tip may be used to apply a welding rod to the joint to fill the joint.

According to one specific example of this step, and with reference to FIGS. 1 and 2, the welding tip 10 may be positioned on a heat gun such that the attachment portion 14 is positioned about a nozzle of the gun. The welding tip 10 is oriented so that the welding rod feed section 22 is situated above the base 12 relative to the joint between the flooring 42 and the trim 44 (i.e., rotate FIG. 1 180° counterclockwise to weld from left to right in FIG. 1). The welding rod 60 is positioned in the opening 24 in the welding rod feed portion 22 of the welding tip 10. The heat gun, having the welding tip 10 thereon, may be heated to any suitable welding temperature. By way of non-limiting example, between about 500° F. and 800° F. The settings for individual heat guns may vary. It is preferred, however, that in one embodiment the heat gun be set to achieve the above specified temperature. Upon heating of the heat gun, the welding rod 60 is positioned in the welding rod feed section 22, and the tip 10 is positioned over the joint between the flooring 40 and the trim 44 such that the intersection 62 of the welding rod 60 is positioned in and along the joint. The welding tip 10 provides hot air directed through the opening 20 and underneath the emerging welding rod 60 towards the flooring 40 and trim 44. It is desirable that the welding tip 10 provide heat to both the flooring 40 and the trim 44 and the rod 60 to properly weld the flooring 40 and the trim 44 together. In one embodiment, the flooring 40 and the trim 44 may be welded together at a rate of one to two linear feet per minute.

The heat gun is held in a position such that the flange 30 of the welding tip 10 is at about a 43-45 degree angle. The convex surface of the flange 30 applies an inward pressure to the heated welding rod, more specifically the incurvature portion 70, to press and dimensionally contour the solidifying welding rod into the joint between the flooring 40 and the trim 44 during the welding process. The highly polished nature of the convex surface may provide the finished weld bead with a smooth surface profile. Further, the highly polished surface may reduce the amount of material that may otherwise adhere to the convex surface. Once the joint has been welded, the tip 10 may be removed from the flooring 40 and the trim 44.

Accordingly, the method described above involves less than half the steps of the prior art process described in the background section. On the whole, it is believed that the present disclosure may reduce plastic flooring installation time for typical applications by several days, reduce product costs by about 30%, decrease manufacturing lead time by about 50%, and decrease the labor portion by about 30%.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. A welding tip for welding plastic material, the welding tip comprising:
 a base that includes an attachment portion and an output end, the attachment portion being adapted to engage a heat gun and the output end being configured to direct a flow of hot air;
 a welding rod feed section secured to the base and having an opening that guides a plastic welding rod through the opening so that the plastic welding rod intersects the flow of hot air when the heat gun is heated, the welding rod feed section having a generally triangularly-shaped cross-section throughout its extent, and the opening having a v-shaped cross section; and
 a flange secured to the welding rod feed section and extending at an angle relative to the welding rod feed section, the flange having a convex surface facing the opening in the welding rod feed section and configured to apply pressure to the plastic welding rod as the plastic welding rod is heated and positioned in and along a joint between surfaces to be welded, the plastic welding rod having a generally triangular cross-sectional profile that is complementary to the generally triangularly-shaped cross-section of the welding rod feed section, wherein the generally triangular cross-sectional profile of the plastic welding rod includes an intersection from which a first and a second side wall extend to a hypotenuse wall opposite the intersection, the hypotenuse wall having opposed first and second generally planar end portions adjacent the first and second side walls and having an incurvature portion between the first and second end portions, and wherein the incurvature portion presents a concave surface that generally complements the flange's convex surface in order to facilitate a pressing action between the surfaces during a welding event.

2. The welding tip of claim 1, wherein the first and second side walls extend from the intersection at an angle of about 86-90°, and wherein the first and second side walls form opposed first and second angles with the hypotenuse wall each between about 43-45°.

3. The welding tip of claim 1, wherein the convex surface of the flange that applies pressure to the welding rod is polished.

4. The welding tip of claim 1, wherein the output end includes an air opening to direct the flow of hot air.

5. The welding tip of claim 1, wherein the flange extends at an angle of 20° to 30° relative to the welding rod feed section.

6. The welding tip of claim 1, wherein the plastic welding rod is composed of polyvinyle chloride.

* * * * *